S. R. ADAMS.
WAVE MOTOR.
APPLICATION FILED JUNE 6, 1918.
1,318,637.
Patented Oct. 14, 1919.
2 SHEETS—SHEET 1.
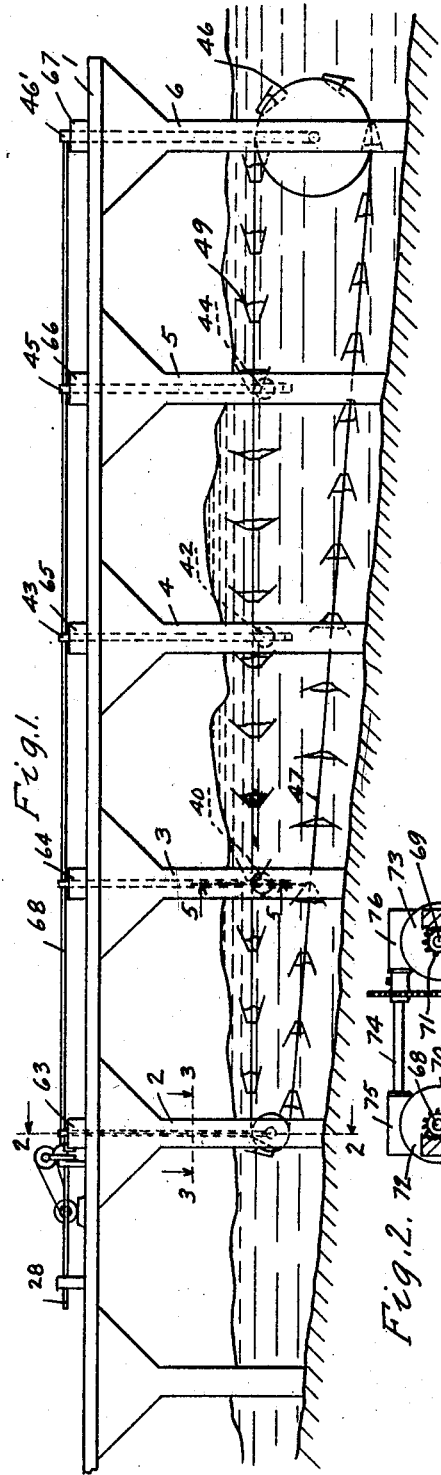
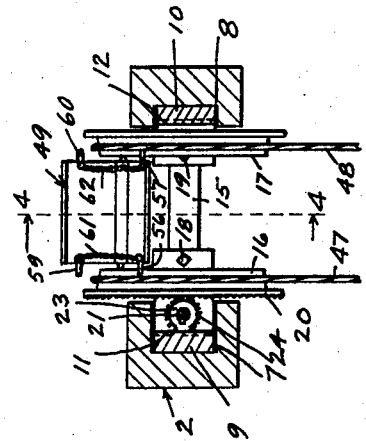
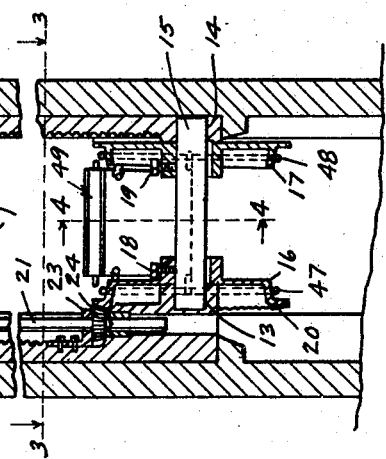
Inventor:
Sherman R. Adams,
by Hazard & Miller
Attys.

S. R. ADAMS.
WAVE MOTOR.
APPLICATION FILED JUNE 6, 1918.

1,318,637.

Patented Oct. 14, 1919.
2 SHEETS—SHEET 2.

Inventor:
Sherman R. Adams,
by Hazard & Miller
Attys.

UNITED STATES PATENT OFFICE.

SHERMAN R. ADAMS, OF LONG BEACH, CALIFORNIA.

WAVE-MOTOR.

1,318,637.  Specification of Letters Patent.  Patented Oct. 14, 1919.

Application filed June 6, 1918. Serial No. 238,544.

*To all whom it may concern:*

Be it known that I, SHERMAN R. ADAMS, a citizen of the United States, residing at Long Beach, in the county of Los Angeles and State of California, have invented new and useful Improvements in Wave-Motors, of which the following is a specification.

My invention relates to wave motors and consists in the novel features herein shown, described and claimed.

Figure 1 is a side elevation of a pier equipped with a wave motor embodying the principles of my invention.

Fig. 2 is a vertical cross-section on the line 2—2 of Fig. 1.

Fig. 3 is a horizontal sectional detail on the lines 3—3 of Figs. 1 and 2.

Figure 4:
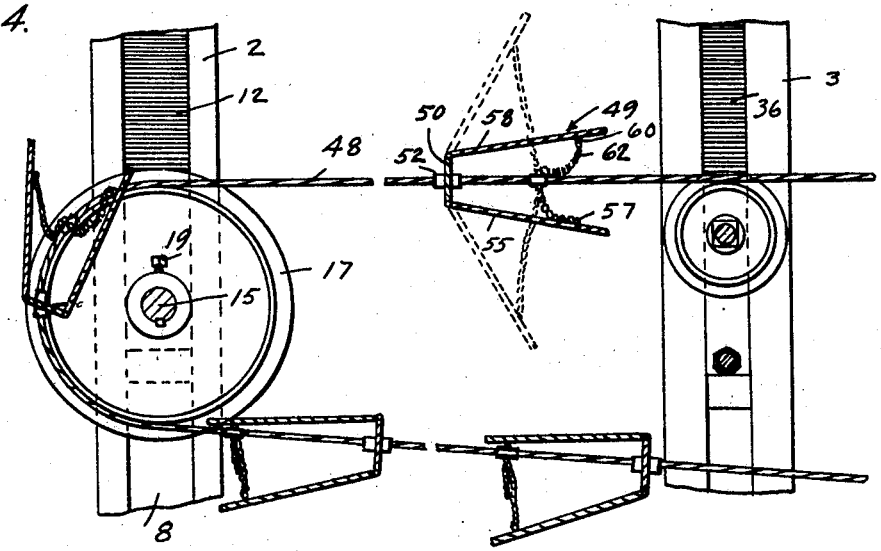
Fig. 4 is an enlarged fragmentary vertical longitudinal sectional detail on a plane parallel with Fig. 1 and on the lines 4—4 of Figs. 2 and 3.
Figure 5:
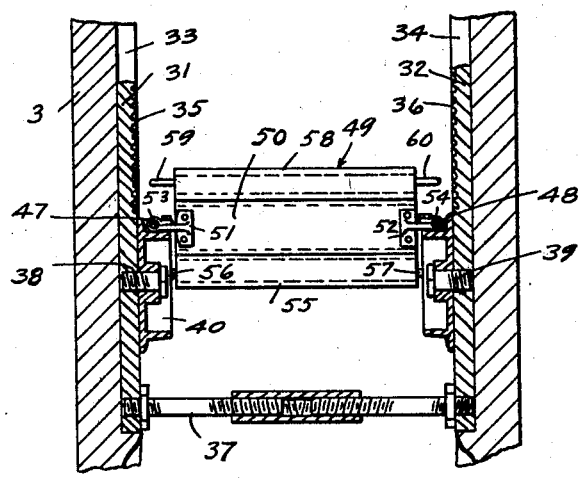
Fig. 5 is a fragmentary cross-section on the line 5—5 of Fig. 1.

The pier platform 1 is mounted upon the piles 2, 3, 4, 5 and 6. The pier platform 1 extends a considerable distance straight out into the ocean from the shore. The piles 2 are channel-shaped in cross-section with the channels 7 and 8 facing each other. Bars 9 and 10 are slidingly mounted in the channels 7 and 8 and gear racks 11 and 12 are formed upon the inner faces of the bars 9 and 10. Bearings 13 and 14 are formed at the lower ends of the bars 9 and 10 and a stub-shaft 15 is loosely mounted in these bearings. Flanged drum wheels 16 and 17 are fixed upon the ends of the shaft 15 against the inner faces of the bearings 13 and 14 by set-screws 18 and 19. A bevel gear 20 is formed upon the outer face of the drum wheel 16.

The pier platform 1 connects the upper ends of the piles 2. A drive shaft 21 is mounted in a bearing 22 fixed upon the platform 1 and the shaft extends downwardly inside of the gear rack 11 slidingly through a bearing 23, said bearing 23 being fixed to the bar 9. A bevel pinion 24 is slidingly splined upon the shaft 21 in mesh with the bevel gear 20. The pinion 24 is held to go up and down with the bar 9 and gear rack 11 while the shaft 21 is held against endwise movement by the bearing 22 and is free to rotate. A countershaft 25 is mounted upon the platform 1 and is connected to the drive shaft 21 by bevel gears 26 and 27. The driven shaft 28 is mounted longitudinally of the platform 1 and connected to the countershaft 25 by gears 29 and 30.

The piles 3 are channel-shaped in cross-section similar to the piles 2, and bars 31 and 32 are slidingly mounted in the channels 33 and 34, and gear racks 35 and 36 are formed upon the inner faces of the bars 31 and 32. A turnbuckle brace 37 connects the lower ends of the bars 31 and 32. Trunnions 38 and 39 are fixed in the bars 31 and 32 above the brace 37 and drum wheels 40 are rotatably mounted upon these trunnions 38 and 39 against the inner faces of the bars 31 and 32. In a like manner a pair of drum wheels 42 is mounted upon bars 43 slidingly mounted in the piles 4, and drum wheels 44 are mounted upon bars 45 slidingly mounted in the piles 5, said drum wheels 40, 42 and 44 being in horizontal alinement with the upper sides of the drum wheels 16 and 17 and serving as guide pulleys. The drum wheels 46 are mounted upon sliding bars 46′ in the piles 6, said drum wheels 46 being larger than the drum wheels 16 and 17 and the tops of the wheels 46 being on a level with the tops of the wheels 16, 17, 40, 42 and 44, and the bottoms of the wheels 46 being considerably below the bottoms of the wheels 16 and 17. The cable 47 runs around the drum wheel 16 and one of the drum wheels 46 and over one of each pair of guide drum wheels 40, 42 and 44, and the cable 48 runs around the drum wheel 17 and one of the drum wheels 46 and the other ones of the guide drum wheels 40, 42 and 44.

Folding feathering impellers 49 connect the cables 47 and 48 crosswise at suitable distances apart, said impellers being mounted to be opened and pushed by the incoming waves and by the outgoing undertow. In other words, the impellers 49 face the shore on a line between the upper sides of the wheels 46 and the upper sides of the wheels 16 and 17 and face away from the shore on the return line from the lower faces of the wheels 16 and 17 to the lower faces of the wheels 46. As the cables 47 and 48 are driven by the impellers 49 the wheels 16 and 17 will be rotated to operate the bevel gear 20, drive the pinion 24, rotate the shaft 21, and drive the countershaft 25 to operate the driven shaft 28, and power may be taken from the driven shaft 28 in any suitable way and for any desired purpose.

Each impeller 49 comprises a central plate 50, attaching plates 51 and 52 secured to the ends of the central plate 50, clamps 53 and 54 extending outwardly from the attaching plates 51 and 52 and clamping the cables 47 and 48, a lower wing 55 hinged to the lower edge of the plate 50, guide fingers 56 and 57 extending from the ends of the lower wing 55, an upper wing 58 hinged to the upper edge of the plate 50, fingers 59 and 60 extending from the ends of the upper wing, and chains 61 and 62 connecting the lower wing 55 to the upper wing 58 to limit the spread of the wings.

In the operation of the cables 47 and 48 and the impellers 49 the fingers 56 and 57 will engage upon the peripheries of the wheels 16 and 17 in making the turn around at the front end of the orbit and the fingers 56, 57, 59 and 60 will engage the cables 47 and 48 to limit the swing of the wings inwardly and the chains 61 and 62 will limit the swing outwardly.

The impellers 49 will fall or feather in going against a current and will unfold when going with the current, provided the current or wave is moving faster than the impellers.

Pairs of pillars 63, 64, 65, 66 and 67 extend upwardly from the pier platform 1 and shafts 68 and 69 are mounted in bearings upon these pillars. Pinions 70 and 71 are fixed upon the shafts 68 and 69 in mesh with the gear racks 11 and 12 upon the sliding bars 9 and 10 and the gear racks 35 and 36 upon the sliding bars 31 and 32 and the gear racks upon the sliding bars 43, 45 and 47. Worm gears 72 and 73 are fixed upon the shafts 68 and 69 and a connecting shaft 74 carries worms 75 and 76 in mesh with the gears 72 and 73. A motor 77 is mounted upon the pier platform 1 and connected to the shaft 74 by the chain and sprockets 78, so that as the motor 77 operates, the shafts 68 and 69 will be simultaneously operated to raise or lower the drum wheels 16 and 17, the guide drum wheels 40, 42 and 44, and the drum wheels 46 to raise or lower the cables 47 and 48 carrying the impellers 49. If desired the motor 77 may be an electric motor or a gasolene engine, or the motor may be omitted and the shaft 74 operated manually or in any other desired manner.

Various changes may be made in the details of construction without departing from the spirit of my invention as claimed.

I claim:

1. A wave motor comprising piles; a platform mounted upon the piles, said platform extending straight out into the ocean from the shore, and said piles being channel-shaped in cross section with the channels facing each other; bars slidingly mounted in the channels; gear racks formed upon the inner faces of the bars; means for operating the gear racks to raise and lower the bars; bearings at the lower ends of the bars; a shaft loosely mounted in the bearings; flanged drum wheels fixed upon the ends of the shaft; a bevel gear upon the outer face of one drum wheel; a drive shaft mounted vertically and extending downwardly inside one gear rack; a bevel pinion slidingly splined upon the drive shaft in mesh with the bevel gear upon the drum wheel; a countershaft mounted upon the platform; bevel gears connecting the countershaft to the drive shaft; said piles being at the land end of the pier; second piles at the ocean end of the pier; drum wheels mounted between the second pair of piles; cables running around the first and second drum wheels; and feathering impellers mounted upon the cables so that the incoming waves will operate the upper impellers and so that the undertow will operate the lower impellers.

2. A wave motor comprising a suitable support extending from a shore into the ocean, bars mounted to slide vertically in the support, gear racks formed upon the inner faces of the bars, means for operating the gear racks to raise and lower the bars, bearings at the lower ends of the bars, shafts loosely mounted in the bearings, flanged drum wheels fixed upon the ends of the shafts, a bevel gear upon the outer face of one drum wheel, a drive shaft mounted vertically, a bevel pinion slidingly splined upon the drive shaft in mesh with the bevel gear upon the drum wheel, cables running around the drum wheels, and feathering impellers mounted upon the cables.

In testimony whereof I have signed my name to this specification.

SHERMAN R. ADAMS.